(12) United States Patent (10) Patent No.: US 11,445,089 B2
Schramm et al. (45) Date of Patent: Sep. 13, 2022

(54) SELECTIVE REDUCTION OF PRINT SUBSTANCE CONSUMPTION

(71) Applicant: HEWLETT-PACKARD DEVELOPMENT COMPANY, L.P., Spring, TX (US)

(72) Inventors: Morgan T. Schramm, Vancouver, WA (US); Wesley R. Schalk, Vancouver, WA (US); Ranjit Bhaskar, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/609,473

(22) PCT Filed: May 15, 2018

(86) PCT No.: PCT/US2018/032822
§ 371 (c)(1),
(2) Date: Oct. 30, 2019

(87) PCT Pub. No.: WO2019/221718
PCT Pub. Date: Nov. 21, 2019

(65) Prior Publication Data
US 2021/0409572 A1 Dec. 30, 2021

(51) Int. Cl.
*H04N 1/00* (2006.01)
*H04N 1/405* (2006.01)
*H04N 1/52* (2006.01)

(52) U.S. Cl.
CPC ............ *H04N 1/4051* (2013.01); *H04N 1/52* (2013.01)

(58) Field of Classification Search
None
See application file for complete search history.

(56) References Cited

U.S. PATENT DOCUMENTS

| | | | |
|---|---|---|---|
| 4,884,080 A * | 11/1989 | Hirahara | H04N 1/52 430/293 |
| 5,473,446 A | 12/1995 | Perumal et al. | |
| 5,923,774 A | 7/1999 | Ostromoukhov | |
| 6,250,733 B1 | 6/2001 | Yao et al. | |
| 6,363,172 B1 | 3/2002 | Cheung et al. | |
| 6,373,594 B1 | 4/2002 | Yao et al. | |
| 7,199,888 B2 | 4/2007 | Parker et al. | |
| 7,394,572 B2 | 7/2008 | Nakahara | |
| 8,068,257 B2 | 11/2011 | Li et al. | |
| 9,167,129 B1 * | 10/2015 | Subbaian | H04N 1/405 |
| 9,646,367 B2 * | 5/2017 | Tamura | G06T 5/003 |
| 10,326,910 B2 * | 6/2019 | Morovic | H04N 1/405 |
| 2009/0195833 A1 | 8/2009 | Lapstun | |
| 2010/0290089 A1 * | 11/2010 | Stevens | H04N 1/40062 358/3.06 |
| 2011/0051197 A1 * | 3/2011 | Yao | H04N 1/58 358/3.06 |
| 2011/0069328 A1 * | 3/2011 | Ulichney | H04N 1/4055 358/1.9 |

(Continued)

*Primary Examiner* — Henok Shiferaw
(74) *Attorney, Agent, or Firm* — Conley Rose PC

(57) ABSTRACT

An image file is prepared for printing. The image file is received. The image file includes a cell having pixels. A pixel of the pixels of the cell corresponds with a command to apply a print substance to a medium. For the pixel, the command to apply the print substance is selectively replaced with a command to not apply the print substance.

14 Claims, 3 Drawing Sheets

RECEIVE IMAGE FILE PREPARED FOR PRINTING
102

SELECTIVELY REPLACE COMMAND TO APPLY PRINT SUBSTANCE WITH COMMAND TO NOT APPLY PRINT SUBSTANCE FOR A PIXEL
104

100

(56) References Cited

U.S. PATENT DOCUMENTS

| | | | |
|---|---|---|---|
| 2014/0368886 A1* | 12/2014 | Li | H04N 1/58 358/3.06 |
| 2015/0165689 A1 | 6/2015 | Travers et al. | |
| 2017/0085750 A1* | 3/2017 | Katsuyama | H04N 1/52 |
| 2017/0126930 A1* | 5/2017 | Wakui | G06K 15/1873 |
| 2018/0056666 A1* | 3/2018 | Mizuno | B41J 2/205 |
| 2020/0039235 A1* | 2/2020 | Katsuyama | G06K 15/1881 |
| 2021/0160399 A1* | 5/2021 | Katsuyama | H04N 1/00039 |

\* cited by examiner

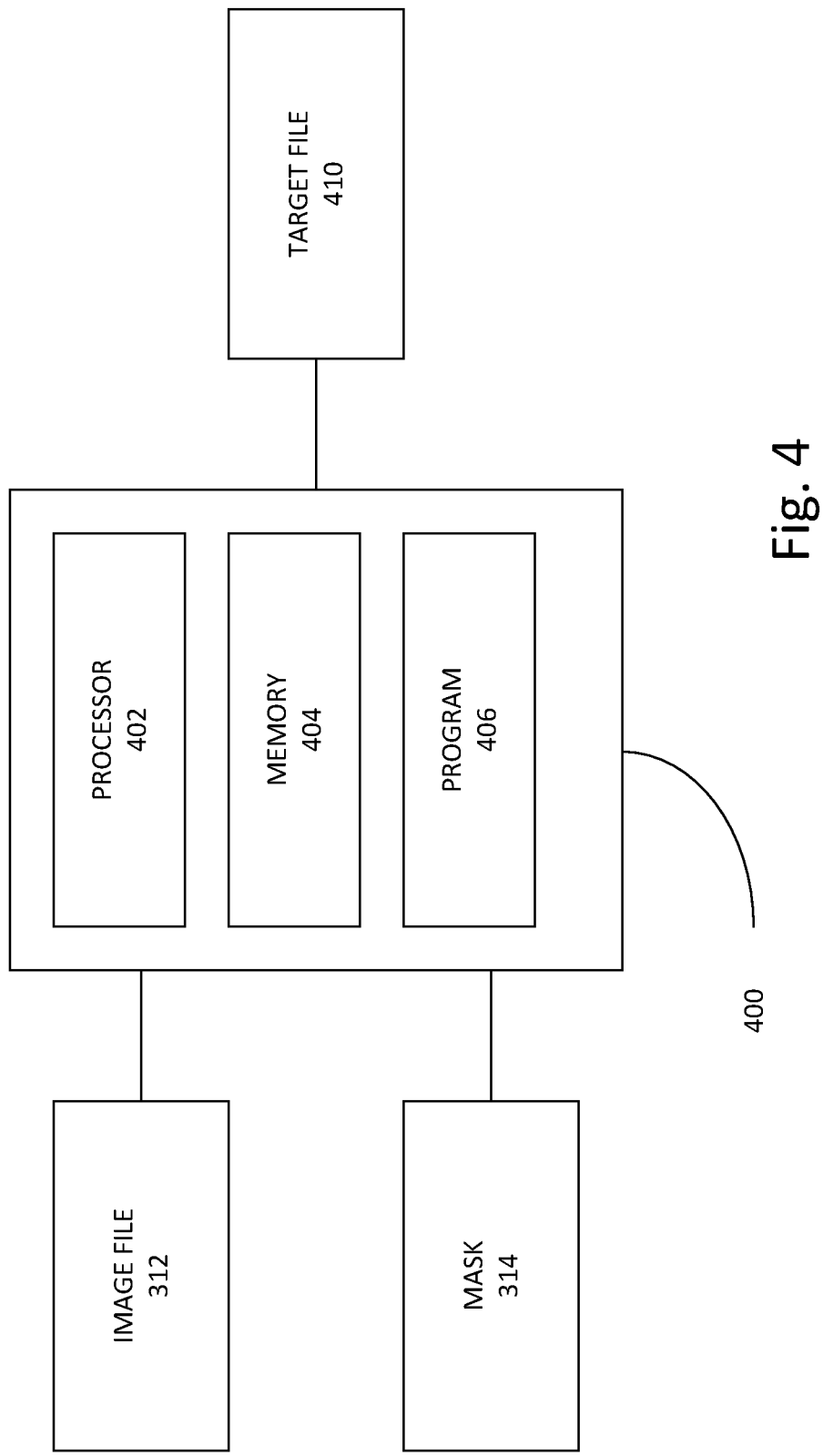

SELECTIVE REDUCTION OF PRINT SUBSTANCE CONSUMPTION

BACKGROUND

Printing devices—including printers, copiers, fax machines, multifunction devices including additional scanning, copying, and finishing functions, all-in-one devices, or other devices such as pad printers to print images on three dimensional objects and three-dimensional printers—receive image or model sources and produce objects or images on media. For example, printheads can produce images on the media or can form successive layers of material to produce a three-dimensional object. In general, printing devices apply a print substance, which can include printing agents or colorants, to a medium. A medium is a superset of a print substrate, such as plain paper or photopaper, and can include any suitable object or materials to which a print substance from a printing device are applied including materials, such as powdered build materials, for forming three-dimensional articles. Print substances, including printing agents and colorants, are a superset of inks and can include toner, liquid inks, or other suitable marking material that may or may not be mixed with fusing agents, detailing agents, or other materials and can be applied to the medium.

BRIEF DESCRIPTION OF THE DRAWINGS

FIG. 4 is a block diagram illustrating an example computing system to implement the example method of FIG. 1, the example computing system of which can be implemented in the example printing system of FIG. 3.

DETAILED DESCRIPTION

Figure 1:
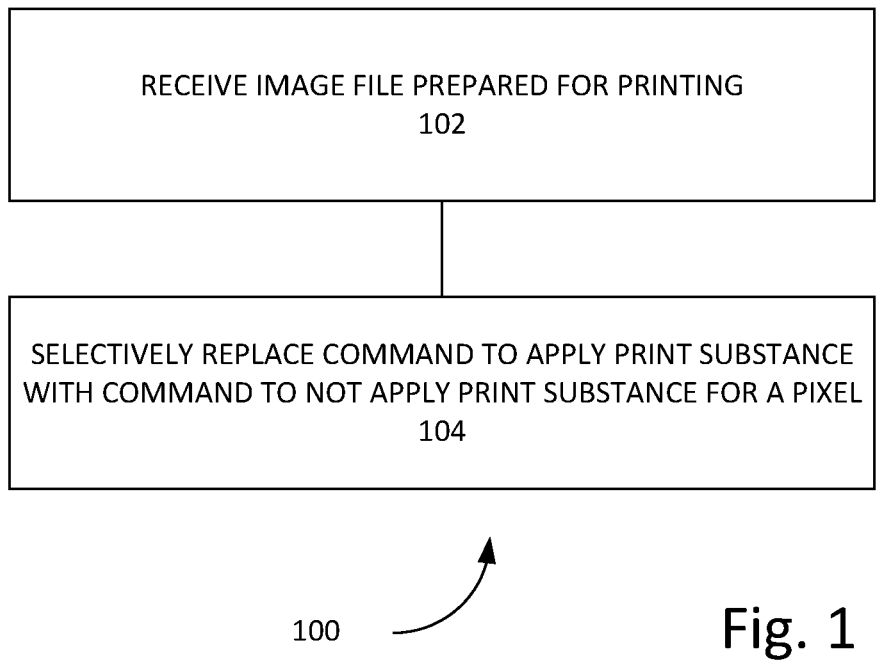
FIG. 1 is a block diagram illustrating an example method.

Printing devices and printing systems in general can include digital print processing pipelines having processing elements to convert digital source files of images, including two dimensional images or three-dimensional models, received as inputs into signals to control the printheads to selectively apply print substance formulations at various positions of the medium. Digital source files, including user-generated documents and photographs, can be created or modified with various systems such as image scanners, digital cameras, and software applications including browsers, word processors, and photo and design programs and provided to print systems in a file format that can be used to store or transfer the digital source file. The print processing pipeline, which can include processing elements such as processes, functions, and threads, receives the digital source file and provides an output in a form specific to a printing device. The print processing pipeline can be provided with printing device firmware or software and operating systems, including print drivers, that can include instruction sets of commands for processing the image file that can use data structures such as tables embedded or stored on memory devices.

Using the print processing pipeline, the digital source file is converted into an image file prepared for printing, which is eventually presented as signals to control the printhead. In one example, the image file prepared for printing can exist as a digital file presented in a page description language, such as PostScript, or a printer control language, such as Printer Command Language, or PCL, that can include text or binary data streams to be printed in a stage of the pipeline. The image file presented for printing can also exist as an output bitmap in a stage of the pipeline. Example processes in the pipeline can include the determination of print substance formulations to render colors of images on the medium as well as the determination of positions on the medium of which to apply the print substance formulations to express additional colors and to generate a printed image.

One example of a process applied in converting a digital source file into an image file presented for printing can include mapping the colors of the digital source file from a first color space into a color space of the printing device. A color space is a system having axes and that describes color numerically. Some software applications and display devices may employ a type of additive color space, such as a red-green-blue (RGB) color space, while some printing devices may employ a type of subtractive color space, such as a cyan-magenta-yellow-key (black) (CMYK) color space. The mappings may be specified using tables such as look up tables, to which interpolation can be applied, or through a series of parameters for transformations. Many colors in the gamut of a CMYK color space for printing devices can be rendered from print substance formulations created from the set of process colors of cyan, magenta, and yellow and, in some color resource models, do not include a black channel component. In many printing devices and printing modes, however, an achromatic black channel component can be added to some of colors in the CMYK color space in order to reduce process color print substance consumption for some darker colors, stabilize neutral color such as in the grey tones, and to improve printability of blacks.

Another example of a process applied in converting a digital source file into an image file presented for printing can include mapping the colors of the digital source file to a plurality of pixels in order to direct the printhead to apply a print substance to the medium. For example, an image file includes a plurality of pixels, and each pixel in the image file includes either a command to apply a print substance or a command to not apply a print substance. A plurality of pixels can be arranged in a cell. An image file may include a plurality of cells. In one example, the pixels are arranged in a rectangular array in the cell. An example of a cell used for illustration includes a square matrix of i by i pixels. In one example, a command to not apply a print substance to the medium can include an absence of a command to apply print substance to the medium. A pixel that corresponds with a command to apply a print substance is a printed pixel, and a pixel that corresponds with a command to not apply a print substance is an unprinted pixel. For example, an image file in which every pixel includes a command to apply a print substance to the medium can produce a solid fill of print substance on the medium.

Preparing a pattern for halftoning is a particular example of mapping the colors of the digital source file to a plurality of pixels in order to direct the printhead to apply a print substance to the medium. In one example, halftoning is a process of rendering continuous-tone images with the limited output levels of the printing device. The human visual system acts like a spatial low-pass filter that can blur a pixel pattern so that it is perceived as a continuous-tone image when viewed from a sufficient distance. Halftoning attempts to generate a low bit-depth image that reproduces correct tone and detail of an original image while reducing visible artifacts. Screening is an example of halftoning and is classified according to whether it generates dispersed or clustered dots of colored pixels, and whether the resulting textures are periodic or aperiodic. Halftoning is also used to create a multiplicity of colors with the four cyan, magenta, yellow, and black print substances. By varying the density or frequency of the colored pixels of each print substance applied to a medium, many shades of colors can be reproduced on the medium.

Typically, spot colors and process colors including cyan, magenta, and yellow print substances are significantly more expensive than similar amounts of black print substances; and depending on the application or the industry, the disparity can lead to a substantially greater expense for full color printing versus greyscale printing. Some users may attempt to address this additional expense by generally printing greyscale documents while sparingly printing full-color documents or by printing all documents in greyscale. Often, greyscale versions of color documents lack significant information or distinctions that users may find valuable. Other users may attempt to address the additional expense by printing documents with depleted color print substance formulations that compromises print quality. In an example of a depleted color print substance formulation, the amount of the subtractive color print substance in the print substance formulation is uniformly scaled back from an amount used to provide full color print substance formulation to produce a washed out depiction of the source document. As many colors do not include a black component in the subtractive color space, such as pastels, such colors become depleted to almost white. While uniform color depletion may convey more information than greyscale and save on expense over a full color print substance formulations, such color depletion outputs typically include poor image quality that many users find unappealing at meaningful reductions in print substance expense.

In response to the added expense of printing with full color print substance formulations and the poor image quality of printing in greyscale or with uniform color depletion, the printing industry has developed color component replacement technologies to improve image quality while reducing the amounts of process color print substances. One such technology includes grey component replacement, or GCR, which replaces a selected amount of process color print substances in the print substance formulation with a black print substance for many colors. GCR renders many colors in print substance formulations with a combination of black and just two colors of three CMY print substances instead of three colors of CMY print substances. GCR can provide significantly better image quality than uniform color depletion and greyscale, and GCR typically saves approximately 20% in costs over full color printing.

In the illustrated examples, a mask can be applied to an image file prepared for printing to print a target image on a medium to reduce the amount of drops printed in a cell. In one example, the target image includes a plurality of cells that have unprinted areas, such as unprinted clusters of pixels, in an otherwise continuous image or halftone. For example, the target image can include an array of unprinted areas, such as unprinted pixels or clusters of pixels, which might otherwise be present if the mask was not applied to the image file. The mask can selectively replace the commands to apply a print substance in the image file with commands to not apply a print substance in a target image. The image file to which the mask has been applied may be further processed or provided to the printhead. The mask can be applied as a filter, or processing element, in a pipeline, or as a chain of processing elements, that converts the print data to a format the printer will understand. In one example, the mask replaces a pattern of subtractive colors in the cell with black pixels in the target image. The mask can be configured to selectively save print substance based on the size of the unprinted clusters of pixels, the frequency of the unprinted clusters of pixels in a cell, or both.

FIG. 1 illustrates an example method 100 of applying a mask to an image file prepared for printing that can reduce the amount of print substance used in printing. The mask can create unprinted areas, such as unprinted pixels or clusters of pixels on a printed image. An image file prepared for printing is received at 102. The image file includes a cell having a plurality of pixels. The image file can include a halftone. In one example, the image file can include a plurality of cells, and a cell of the plurality of cells can correspond with a halftone. A pixel of the plurality of pixels in the cell corresponds with a command to apply a print substance to a medium and renders a printed pixel. For the pixel of the plurality of pixels that corresponds with a command to apply the print substance, the command to apply the print substance is selectively replaced with a command to not apply the print substance at 104. A command to not apply a print substance to the medium results in a pixel without print substance applied to the medium, or an unprinted pixel, and can include an absence of a command to apply print substance to the medium. The cell may include a set of printed pixels of the plurality of pixels, and the command to apply the print substance for each of the pixels in the set of printed pixels can be replaced with a command to not apply print substance. The command to not apply the print substance can be included in a mask, and selectively replacing command to apply the print substance at 104 can include applying the mask to the image file at 104.

The mask can include a plurality of commands to not apply the print substance of the image file in a selected configuration. In one example, the selected configuration can provide unprinted pixels as unprinted areas in the image file as a repetitive pattern across the printed target image on the medium. For instance, the rendered target image after a mask is applied to the image file can include spaced-apart clusters of unprinted pixels at regular intervals from each other horizontally and vertically on the medium. Also, the rendered target image after a mask is applied to the image file can include unprinted pixels arranged in a plurality of diagonal lines of a selected width and spaced-apart from each other at a selected distance on the medium.

The mask can be applied to the entire image file or to selected portions of an image file. For instance, the mask can be configured to avoid areas of text to clearly render text in the target image, but may be applied to color graphics alongside the text to save more expensive print substances. Additionally, the mask may be applied to selected graphics such as bar graphs or pie charts but not applied to other graphics such as photographs that may be included in an image file.

In another example, a cell in the image file can correspond with commands to produce a collection of printed pixels arranged in a selected pattern. The selected pattern can include an arrangement of colors and a configuration of printed pixels within the cell. The mask can be configured to search the image file for instructions that will produce the collection of pixels arranged in the selected pattern, or pattern of pixels. A printed pixel, or a plurality of printed pixels, of the cell having the collection of printed pixel arranged in the selected pattern can be replaced with unprinted pixels. In such an example, the cell includes a pattern of pixels of the plurality of pixels, and replacing the commands to apply the print substance with commands to not apply the print substance includes replacing the commands to apply the print substance with commands to not apply the print substance for the pattern of pixels. In one example, the determination of the selected pattern can be implemented via machine learning to create a target image having an appropriate amount of print substance savings, a target image with reduced visible artifacts (such as noticeable holes of unprinted pixels or lines of unprinted pixels), or both. In one example, the pattern of pixels in the cell can include a first pattern of a plurality of pixels in the subtractive colors print substances, which are replaced with unprinted pixels, and a second pattern of pixels of black print substance are included in the cell. In such an example, each pixel of the plurality of pixels corresponds with a command to apply a subtractive print substance to the medium and selectively replacing the command includes providing a command to apply a black print substance. The number of pixels having just black print substance in the cell can be less than the number of pixels having subtractive color print substances in the cell. In such an example, providing the command to apply the black print substance includes providing the command to apply the black substance to a number of pixels less than a number of pixels in the plurality of pixels.

Figure 2:
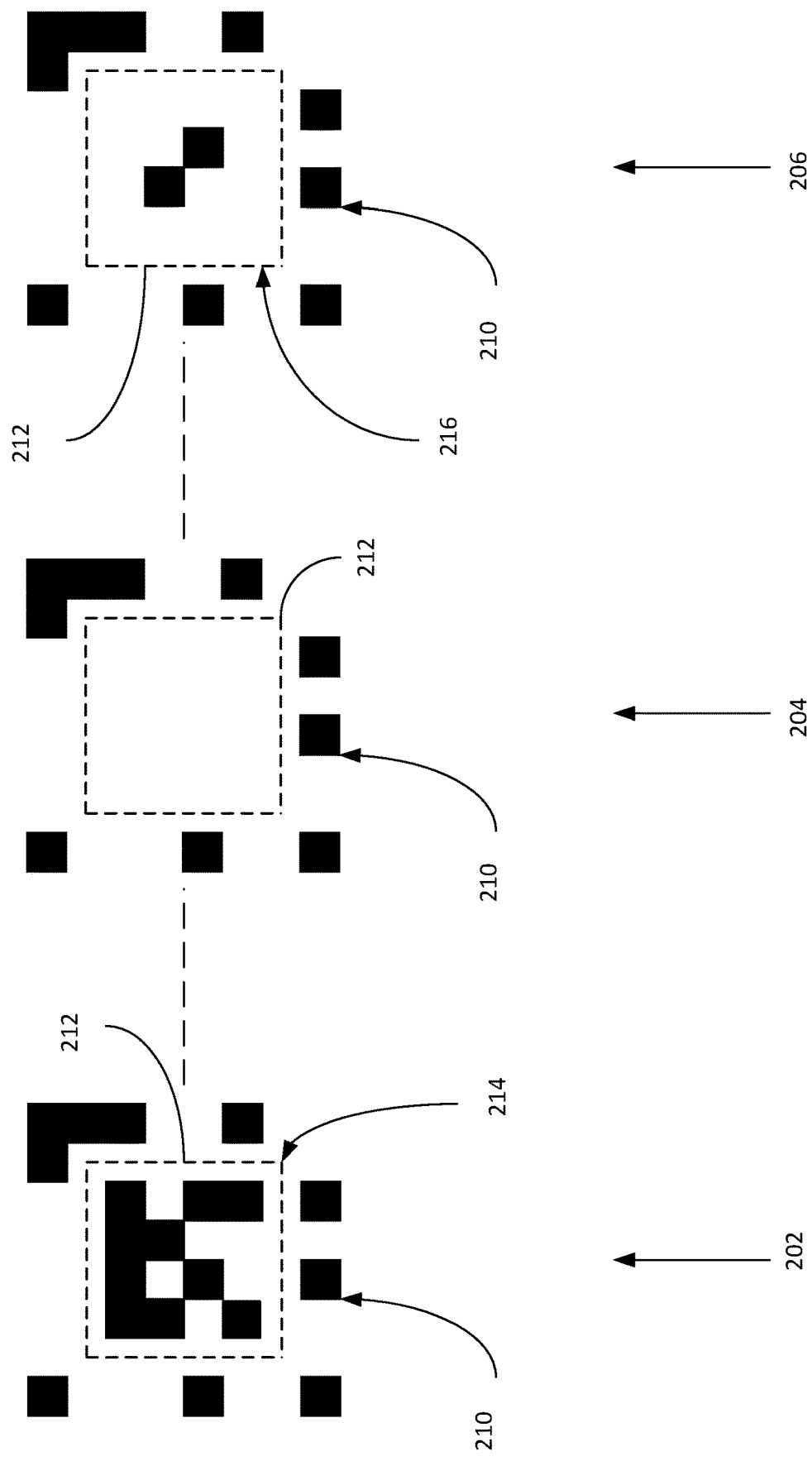
FIG. 2 is a schematic diagram illustrating example images produced according to the method of FIG. 1.

FIG. 2 illustrates an example set of pixels (including printed pixels and unprinted pixels) that can be rendered from in an image file and modulated via method 100. A first stage 202 illustrates an example set of printed pixels 210 that can be rendered by the commands to apply a print substance to a medium in the image file. For instance, the set of printed pixels 210 at the first stage 202 represents the printed pixels if no mask is applied to the image file. The set of printed pixels 210 are presented schematically and can include various colors formed from a print substance or a combination of print substances. The spaces between the printed pixels 210 can represent unprinted pixels. Unprinted pixels correspond with commands to not apply a print substance. In one example, the set of printed pixels 210 rendered from the image file can represent an original image to which screening has been applied.

At the first stage, an example cell 212 is illustrated to include a plurality of pixels of the set of pixels and includes printed pixels and unprinted pixels. The cell 212, however, may or may not correspond with a halftone cell. Each of the printed pixels of the plurality of printed pixels in the cell 212 corresponds with a command to apply a print substance to a medium. The printed and printed pixels in a cell can be arranged in a particular pattern, or first pattern 214.

A second stage 204 illustrates a set of pixels that can be rendered in a target image that results from an example mask applied to the image file. In applying a mask to the image file, the command to apply the print substance to the medium is replaced with a command to not apply the print substance for a pixel. In the example, each pixel in the cell 212 having a command to apply the print substance is replaced with a command to not apply the print substance. Accordingly, the example mask applied to the image file results in a target image that includes cell 212 having unprinted pixels in the second stage 204.

In one example, the cell 212 at the first stage can be a selected pattern of pixels for which the mask can search and replace. The pattern of pixels can include an arrangement of colors and a configuration of printed pixels within the cell 212. The selected pattern of pixels in the image file can be the first pattern of pixels 214. The mask can be applied to the image file to replace the first pattern of pixels 214 with unprinted pixels, such as at the second stage 204, or with a second pattern of pixels 216 in cell 212, such as illustrated in the third stage 206. In the third stage, the commands to apply the print substance that render the first pattern of pixels 214 in cell 212 is replaced with commands to apply the print substance to render the second pattern 216 in cell 212. In one example, the commands to apply the print substance that render the first pattern of pixels 214 in cell 212 can include commands to apply subtractive print substances whereas the commands to render the second pattern of pixels 216 in cell 212 include commands to apply just black print substance. Further, the commands to render the second pattern of pixels 216 in cell 212 can include commands to render less printed pixels than in the first pattern of pixels 214.

Figure 3:
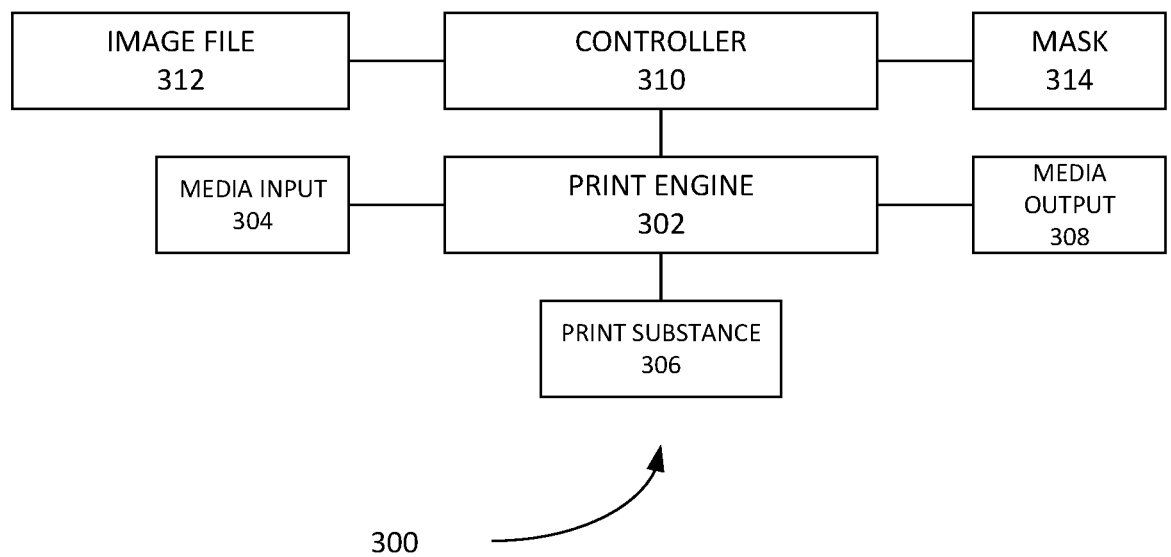
FIG. 3 is a block diagram illustrating an example printing system to implement the example method of FIG. 1.

FIG. 3 illustrates an example printing system 300, which can include a printing device, that can process image files prepared for printing from source files, implement example method 100, and produce objects or images on media. A printing device includes a print engine 302 that includes mechanisms and logic to print or mark images on a medium according to instructions from the image file prepared for printing. A media input 304 can provide a selected medium to the print engine 302 on which the images can be printed or marked. The print engine 302 is coupled to a consumable print substance 306, which can be used to print or mark the medium based on a print substance formulation associated with the source color in a location on substrate according to the image file. In one example, the printing system 300 can implement a spot color or a subtractive color space and the print substance 306 includes each of a cyan, magenta, yellow, and black print substance. In another example, the printing system 300 can implement a greyscale color space and the print substance includes a black print substance. Examples of print engines 302 can include ink jet print engines that apply a fluid, such as a liquid print substance 306, and laser print engines that apply particles of a toner as the print substance 306. In one example, the print engine 302 delivers the print substance 306 to the medium via a printhead proximate the medium. Printed media from the print engine 302 can be provided to a media output 308. In one example, the media output 308 can include or be coupled to a finishing module that can cut, collate, stack, staple, or otherwise provide the printed media in a finished form.

A controller 310, which can include a combination of hardware and programming, such as firmware stored on a memory device, is operably coupled to the print engine 302 to perform methods that control the print process. For example, the controller 310 can receive signals, such as electrical, optical, or mechanical signals, representative of an image file 312 including a cell having a plurality of pixels, a pixel of the plurality of pixels corresponding with a command to apply a print substance in accordance with a source color to the print medium. In one example, the source color is in an input color space to be transformed into a target color in the color space of the printing system 300. The target color includes a print substance formulation, and the controller 310 provides to the print substance formulation to the print engine 302 to deliver the print substance 306 to the selected medium according to the print substance formulation.

In addition, the controller 310 can receive signals representative of a mask 314 that can be applied to the image file 312 to selectively replace the command to apply the print substance with a command to not apply the print substance for a pixel of the plurality of the pixels. In one example, the image file 312 and the mask 314 are received in the controller as a bitstream from a memory device. The controller 310 can process the image file 312 in a pipeline of a plurality of processing elements arranged to provide an output to a printhead. The information that flows in these pipelines is often a stream of records, bytes or bits, and the elements of a pipeline may be called filters. Processing elements can be connected into the pipeline via function composition. The controller 310 can apply the mask 314 to the image file 312 as a filter that converts the mask 314 and the image file 312 into a format for further processing or to a backend system that sends the data to the print engine 302 as a target file. In one example, the controller 310 can apply the mask 314 to the image file 312 at a selected processing element in the processing pipeline of a plurality of processing elements. The print engine 302 is operably coupled to the controller 310 to deliver a print substance 306 to the medium based on a target file having the command to not apply the print substance.

FIG. 4 illustrates an example computing system 400 including a processor 402, memory 404 and program 406 to implement example method 100. In one example, computing system 400 can be implemented with controller 310. Computing system 400 receives mask 314 to modulate the image file 312 in a pipeline and generate a target image file 410 for further processing with the computing system 400 or to present to the print engine 302. Image file 312 includes a cell having a plurality of pixels, a pixel of the plurality of pixels corresponding with a command to apply a print substance to a medium. The mask can selectively replace the command to apply the print substance with a command to not apply the print substance for the pixel in the plurality of pixels. A memory device including the mask 314 can be included with a printing device or on a consumable product for use with the printing device such as a printer cartridge. Program 406 and mask 314 can be implemented as a set of processor-executable instructions stored on a non-transitory computer readable medium such as memory 404. Computer readable media, computer storage media, memory, or memory device may be implemented to include a volatile computer storage media, nonvolatile computer storage media, or as any suitable method or technology for storage of information such as computer readable instructions, data structures, program modules or other data. A propagating signal by itself does not qualify as computer readable media, computer readable storage media, memory, or a memory device.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
receiving an image file prepared for printing, the image file including a halftone cell having a plurality of pixels, a pixel of the plurality of pixels corresponding with a command to apply a print substance to a medium; and
for the pixel of the plurality of pixels, selectively replacing the command to apply the print substance with a command to not apply the print substance,
wherein the image file and a mask are processed as a filter in a pipeline.

2. The method of claim 1 wherein the image file includes a plurality of cells, and the plurality of cells correspond with a rendered halftone.

3. The method of claim 1 wherein each pixel of the plurality of pixels corresponds with a command to apply a print substance to the medium.

4. The method of claim 1 wherein the image file includes a plurality of cells each having a plurality of pixels and selectively replacing the command to apply the print substance with a command to not apply the print substance for the plurality of pixels from the image file.

5. The method of claim 1 wherein the command to not apply the print substance is included in a mask having a plurality of commands to not apply the print substance, and applying the mask to the image file includes selectively replacing commands to apply the print substance with commands to not apply the print substance.

6. The method of claim 5 wherein the commands to not apply the print substance in the mask provides a selected configuration of unprinted pixels in the image file.

7. The method of claim 1 wherein the halftone cell includes a pattern of pixels in the plurality of pixels, and selectively replacing includes replacing commands to apply the print substance with commands to not apply the print substance for the pattern of pixels.

8. The method of claim 7 wherein each pixel of the pattern of pixels corresponds with a command to apply a subtractive print substance to the medium and selectively replacing commands to apply the print substance with commands to not apply the print substance includes providing a command to apply a black print substance to a pixel in the pattern of pixels.

9. The method of claim 8 wherein providing the command to apply the black print substance includes providing the command to apply the black substance to a number of pixels less than a number of pixels in the pattern of pixels.

10. A non-transitory computer readable medium to store computer executable instructions to control a processor to:
receive an image file prepared for printing, wherein the image file includes a cell having a plurality of pixels, wherein a pixel of the plurality of pixels corresponds with a command to apply a print substance to a medium; and
for the pixel of the plurality of pixels, selectively replace the command to apply the print substance to the medium with a command to not apply the print substance,
wherein the image file and a mask are processed as a filter in a pipeline.

11. The non-transitory computer readable medium of claim 10 wherein the command to not apply the print substance to the pixel is included in a mask.

12. The non-transitory computer readable medium of claim 10 wherein the image file is received as a bitstream.

13. A printing device, comprising:
a controller to:
receive an image file prepared for printing, wherein the image file includes a halftone cell having a plurality of pixels, wherein a pixel of the plurality of pixels corresponds with a command to apply a print substance to a medium; and
for the pixel of the plurality of pixels of the image file, selectively replace the command to apply the print substance with a command to not apply the print substance; and a print engine operably coupled to the controller to deliver a print substance to the medium based on the image file having the command to not apply the print substance, wherein the image file and a mask are processed as a filter in a pipeline.

14. The printing device of claim 13 wherein the controller implements a pipeline to provide a target image from the image file and a mask with the command to not apply the print substance.

* * * * *